Jan. 4, 1949.  A. F. EMRICH  2,457,811
WORK HOLDING DEVICE
Filed May 22, 1945
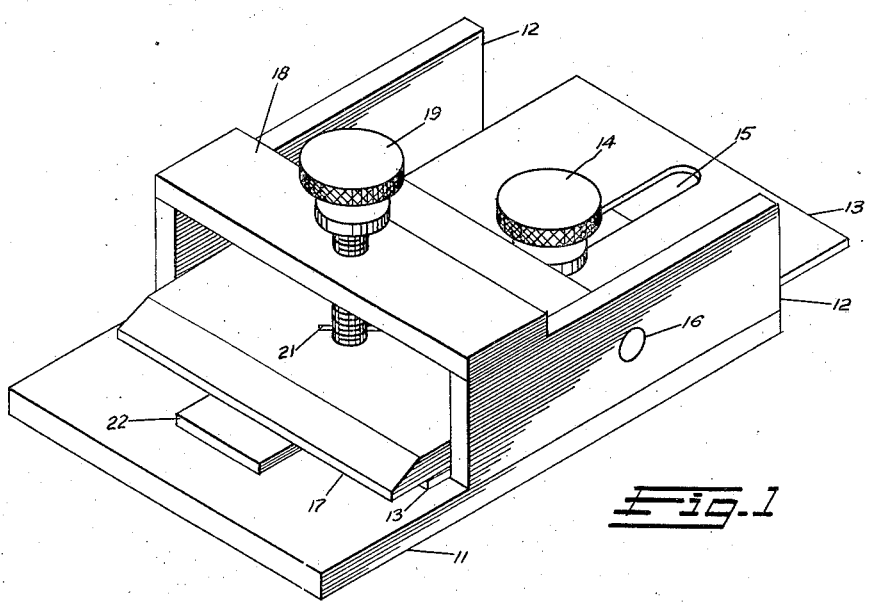
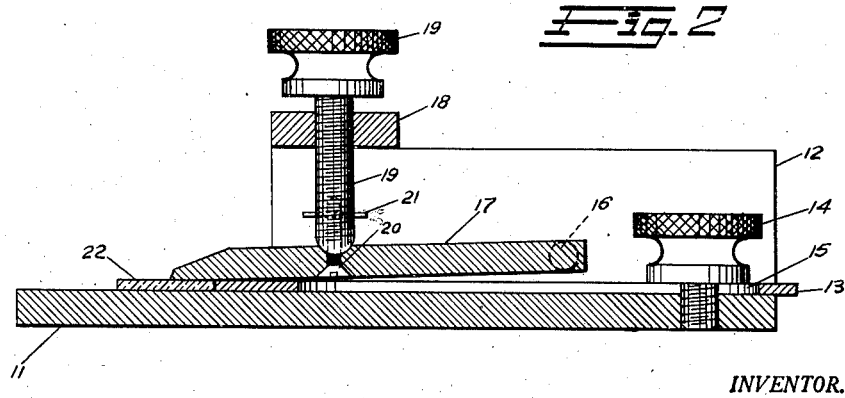
INVENTOR.
Albert F. Emrich
BY
ATTORNEY Patented Jan. 4, 1949

2,457,811

UNITED STATES PATENT OFFICE 2,457,811

WORK HOLDING DEVICE

Albert F. Emrich, Valley Stream, N. Y.

Application May 22, 1945, Serial No. 595,219

1 Claim. (Cl. 144—290)

(Granted under the act of March 3, 1883, as amended April 30, 1928; 370 O. G. 757)

This invention relates to a work-holding device, especially useful for holding small optical mirrors during work upon a section of a surface thereof.

The horizon mirrors of sextants, for example, are small, flat, transparent plates, one surface of which is silvered over half its area, the remainder of the area being clear and transparent. The line of demarcation between the silvered and the clear areas must be straight and sharp. Hitherto one way of attaining this result has been to silver the entire surface, scribe a straight line through the silver layer at the desired point, and remove the silver from the area to be left clear by scraping carefully up to the line. The manual performance of such an operation is time-consuming and wasteful, involving as it does considerable spoilage.

It is an object of this invention to provide a work-holding device that will protect a part of the surface of an object while the remainder of the surface is being worked upon.

Another object is to provide a work-holding device that will simultaneously clamp and hold a work piece and at the same time serve as a guide for the cutting tool so as to define a sharp line of demarcation upon a surface of the workpiece.

Other objects and advantages of this invention, as well as its construction, arrangement and operation, will be apparent from the following description and claim in connection with the accompanying drawing, in which, Fig. 1 is an isometric view of the device of this invention, and Fig. 2 is a central longitudinal section through the longitudinal axis of the device of Fig. 1, seen from the right hand side thereof.

11 represents a base plate, upon which are mounted two parallel side plates 12. Squaring plate 13 rests upon base plate 11 and is contained between side plates 12. Locking screw 14 extends through slot 15 in squaring plate 13, and is in threaded engagement with a hole provided for that purpose in base plate 11.

Side plates 12 are provided with co-axial holes 16. Guide plate 17 is also contained between side plates 12, and is rotatably mounted about the axis of holes 16, said mounting being effected by cap screws, pins or similar means extending from guide plate 17 into holes 16.

Pressure plate 18 extends across the tops of side plates 12 near their forward end. In threaded engagement with a hole centrally located in pressure plate 18 is a pressure screw 19. Guide plate 17 is secured to the end of pressure screw 19 in any suitable manner, as by a flat head screw 20, extending through guide plate 17 and in threaded engagement with a hole drilled into the end of pressure screw 19. Pin 21 may be provided to prevent rotation of flat head screw 20 relative to pressure screw 19. Work piece 22 represents the article being worked upon.

The operation of the device is as follows. Squaring plate 13 is adjusted so that its forward edge is at the desired distance from the forward edge of guide plate 17, and is locked in that position by locking screw 14. Work piece 22 is then placed upon base plate 11, and an edge thereof forced against squaring plate 13. Pressure screw 19 is then turned so that the forward edge of guide plate 17 is brought into contact with the work piece 22, and tightened sufficiently to clamp the work piece 22 firmly against the base plate 11.

It will be apparent that squaring plate 13 and guide plate 17 are preferably made of such a width as to constitute a close fit between the side plates 12, so as substantially to eliminate side play. The edges of squaring plate 13 and guide plate 17 are made as straight and square as possible, thus assuring that the forward edges of these parts will be straight and parallel throughout their lengths. With an edge of work piece 22 abutting squaring plate 13, the forward edge of guide plate 17 will demarcate a line parallel to that edge of work piece 22. The forward edge of guide plate 17 is preferably beveled on the side away from work piece 22, to facilitate access of tools to the line of demarcation defined on work piece 22 by the adjacent edge of guide plate 17.

Once squaring plate 13 has been accurately adjusted for a particular piece of work, any number of successive pieces may be inserted and worked upon without further adjustment. Each work piece may be released and each successive work piece may be clamped in proper position by merely turning pressure screw 19. With the work piece 22 firmly clamped in the device of this invention, the exposed surface may be freely worked upon, with no possibility of the work inadvertently affecting the unexposed surface, and the line of division between the surface worked upon and the surface not worked upon will be sharp and straight.

In the event a line of demarcation is desired that is not straight, or not parallel to an edge of the work, the clamping edge of guide plate 17 may be made in any desired angular relationship with the sides of guide plate 17, or be made in any arcuate or irregular shape, to conform to the shape of the area of the work to be protected.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A work holding device comprising a base plate and two parallel side plates, a squaring plate slidably contained within said side plates and resting upon said base plate, said sliding plate being in slidable and lockable engagement with said base plate, a clamping plate contained within said side plates and rotatably mounted about an axis normal to said side plates, said axis being spaced above said base plate sufficiently to permit the clamping portion of said clamping plate to be nearer said base plate than other portions of said clamping plate are, whereby said clamping plate may be brought to bear on work less high than said plate and positioned on said base against said squaring plate, and adjustable means for moving the said clamping portion of said clamping plate into and out of proximity with said base plate.

ALBERT F. EMRICH.

REFERENCES CITED

The following references are of record in the file of this patent:

UNITED STATES PATENTS

| Number | Name | Date |
|---|---|---|
| 319,816 | Hoefer | June 9, 1885 |
| 1,048,643 | Blackiston | Dec. 31, 1912 |